United States Patent [19]
Rhotert

[11] 3,845,679
[45] Nov. 5, 1974

[54] APPARATUS FOR CUTTING VENEER OR OTHER STRIP MATERIAL
[75] Inventor: Bernhard Rhotert, Hagen, Germany
[73] Assignee: Keller Spezialtechnik GmbH, Laggenbeck, Germany
[22] Filed: Oct. 9, 1973
[21] Appl. No.: 404,797

[30] Foreign Application Priority Data
Oct. 9, 1972 Germany............................ 2249467

[52] U.S. Cl....................... 83/110, 83/362, 83/364, 83/370
[51] Int. Cl............................................... B27l 5/08
[58] Field of Search ............ 83/110, 362, 364, 370, 83/371

[56] References Cited
UNITED STATES PATENTS
2,623,589   12/1952   Price et al............................ 83/110

Primary Examiner—J. M. Meister
Attorney, Agent, or Firm—Mason, Mason & Albright

[57] ABSTRACT

Apparatus for cutting veneer strip comprises an infeed conveyor which determines the speed of the strip, a removal conveyor, and a cutter between the conveyors. The removal conveyor is driven at a higher speed that the infeed conveyor, and a control mechanism is arranged above the removal conveyor to sense the speed of material moving along the removal conveyor. If material is travelling along the removal conveyor at the speed of the infeed conveyor, that is if the material on the removal conveyor is still connected to the strip, the control mechanism actuates the cutter. If the material is travelling at the speed of the removal conveyor, that is if the material has been previously cut from the strip, the cutter device is not actuated. The control mechanism is in the form of photocells which sense the leading edge of the material, and a timer actuated by the photocells.

3 Claims, 2 Drawing Figures

APPARATUS FOR CUTTING VENEER OR OTHER STRIP MATERIAL

BACKGROUND OF THE INVENTION

1. Field of the Invention

The present invention relates to apparatus for cutting strip material, for example veneer strip.

2. Description of the Prior Art

German Pat. specification No. 1,217,051 discloses apparatus for cutting lengths of veneer from a strip, comprising an infeed conveyor which determines the speed of the uncut strip, a removal conveyor, with a higher conveying speed, located downstream of a cutter, a strip feeler controlling the cutter, and devices for actuating the cutter independently of the feeler. The strip feeler is in the form of a speed measuring device, such that a cut is triggered when the measured strip speed is less than the conveying speed of the removal conveyor.

In this previously proposed apparatus the feeler comprises a friction wheel, which, in the event of the strip being corrugated, is likely to slip with the result that the strip will not be cut into sheets of constant length.

Furthermore, when, thin, narrow, veneers and faulty veneer pieces are being conveyed, the latter are displaced by the feeler wheel, so that the abovementioned material is skewed on the removal conveyor and may cause blockages or may be cut at an angle in a following processing cycle with the result that wedge-shaped veneer pieces are produced which are of no use for practical purposes.

SUMMARY OF THE INVENTION

According to the present invention, there is provided in apparatus for cutting strip material, a material infeed conveyor, cutter means downstream of the infeed conveyor, a removal conveyor downstream of the cutter mean, the removal conveyor being drivable at a higher speed than the infeed conveyor, and control means operative to selectively actuate the cutter means, the cutter means also being actuable independently of the control means, said control means comprising first and second sensor means spaced along the path of movement of the removal conveyor and operative to sense material moving along the removal conveyor, and timer means responsive to the sensor means to determine the speed of movement of the material moving along the removal conveyor such that the cutter means is actuated if the said speed is less than a predetermined speed.

BRIEF DESCRIPTION OF THE DRAWINGS

An embodiment of the invention will now be described, by way of example only, with reference to the accompanying diagrammatic drawings, in which.

DESCRIPTION OF THE PREFERRED EMBODIMENT

Figure 1:
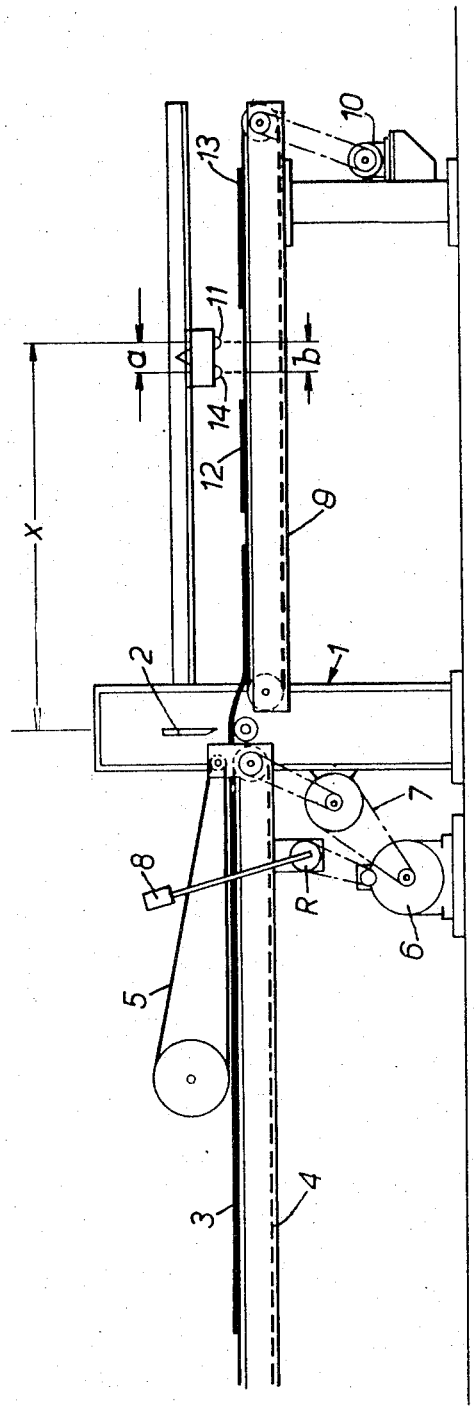
FIG. 1 is a side elevation of apparatus in accordance with the invention.

The cutting apparatus shown in the drawings comprises a cutting device 1 having a movable cutter 2 which cuts a veneer strip 3 into individual pieces. An infeed conveyor 4 is arranged in front of the cutter 2; in combination with an intake device 5 this conveyor conveys the veneer strip 3 at right angles to the cutting plane of the cutter 2 at an input speed (V1) which is continuously variable from zero to a predetermined value.

The conveyor 4 and the intake device 5 are driven by driving means 6 through the intermediary of chain or belt transmission means 7 and infinitely variable transmission means R. The transmission means R can be adjusted by means of a control lever 8 whereby to vary the input speed V1.

A removal conveyor 9 mounted behind the cutter 2 conveys the cut pieces to a further processing station. The speed (V2) of the conveyor 9 is greater than the input speed V1. The conveyor 9 is driven by driving means 10.

A light sensor 11 in the form of a photocell is arranged above the conveyor 9 at a predetermined length (x) from the cutter 2. When the leading edge of the veneer band 3 is sensed by the sensor 11 a signal is generated to actuate the cutter 2 whereby the cut veneer pieces are of a length (x).

For the manufacture for instance of plywood sheets, only veneer pieces which are free from faults and which are of the requisite length (x) can be used. The operater will cut away faulty pieces from the veneer strip 3 by hand in a known manner; in the drawing these faulty veneer pieces are designated by the reference numerals 12 and 13. These faulty veneer pieces 12 and 13 are also conveyed by the conveyor 9.

Due to the presence of the faulty pieces 12 and 13 on the conveyor 9 it is necessary to prevent these pieces from causing the cutter 2 to effect a cut when they are sensed by the sensor 11 because this would cause a veneer piece of shorter length to be cut off from the veneer strip 3. It is thus necessary that the faulty veneer pieces 12 and 13 should pass under the sensor 11 without causing a cut to be made, whereas the leading edge of the strip 3 should cause a cut to be made when the leading edge is senses by the sensor 11. This effect is produced by providing a second light sensor 14 also in the form of a photocell upstream of the first sensor. The sensor 14 is combined with an electronic timing device Z (FIG. 2) having a very short restoring time. The sensors are spaced by a distance $a$ — for instance 100 mm. In this manner there is formed a speed measuring section $b$ between the two sensors in which the timing device Z ascertains the speed at which the leading edge of the veneer strip 3 or the veneer piece 12 or 13 passes through the measuring section $b$.

The timing device is set to a reference time corresponding to a speed which is slightly above the maximum input speed V1, such that the leading edge of the veneer strip travelling through the measuring section $b$ at this speed will trigger a cut by the cutter 2 on being sensed by the sensor 11. As will be apparent, up to this moment the veneer piece having the fixed length (x) will not have been separated from the veneer strip 3 and will therefore have a speed corresponding to the input speed V1 of the conveyor 4. The sensor 11 therefore responds, and issues a cutting signal to the device which controls the cutter 2 only if the speed of the leading edge of the veneer strip 3 travelling through the measuring section $b$ is below the value of the speed corresponding to the reference time set in the timing device Z.

The speed V2 of the conveyor 9 is always slightly higher than the input speed V1, and the faulty veneer pieces 12 and 13 will travel through the measuring section at the speed V2, that is to say they are moved through the measuring section in a time less than the reference time and therefore the sensor 11 will not respond to the faulty veneer pieces 12 and 13 with the result that no cutting signal will be given.

The control circuit for the cutter 2 will now be described with reference to FIG. 2.

Figure 2:
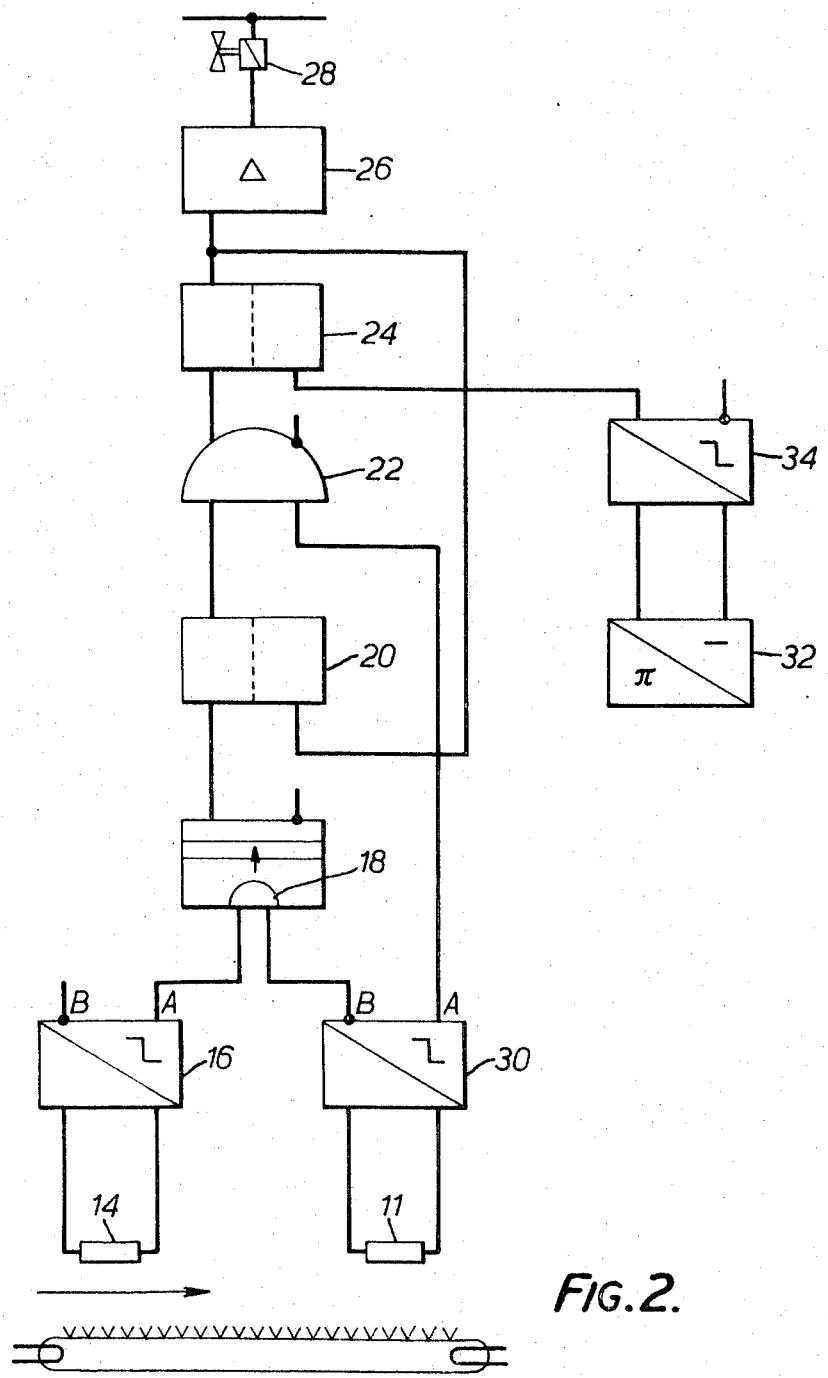
FIG. 2 shows a control circuit of the apparatus.

As shown in FIG. 2, the sensor 14 is connected to a measuring trigger 16 preferably in the form of a threshold device having a normal output A and an inverse output B. The normal output A of the trigger 16 is connected to one input and of AND-gate 18, the output of the gate 17 being connected to the timing device Z. The timing device Z has an output connected to a set input of a store 20 preferably in the form of a bistable multivibrator.

An output from the multivibrator 20 is connected to one input of an AND-gate 22, an output of the gate 22 being connected to a store 24 preferably in the form of a bistable multivibrator.

An output from the multivibrator 24 is connected to the input of an amplifier 26 and to the reset input of the multivibrator 20. The output from the amplifier 26 is connected to a cutter drive device 28.

The sensor 11 is connected to a measuring trigger 30 preferably in the form of a threshold device having a normal output A and an inverse output B. The inverse output B of the trigger 30 is connected to the second input of the AND-gate 18 and the normal output A of the trigger 30 is connected to the second input of the AND-gate 22. A cutter return sensor 32 is connected to a measuring trigger 34, an output of the trigger 34 being connected to the reset input of the multivibrator 24.

In operation, when the leading edge of a veneer is sensed by the sensor 14, the measuring trigger 16 provides an output signal at its normal output A. At this time since no veneer is sensed by the sensor 11 the sensor 11 will provide an output signal at its inverse output B. As a result the AND-gate 18, will provide an output signal to start the timing device Z.

If the leading edge of the veneer is sensed by the sensor 11 before the timing device Z times out, that is if the veneer is travelling at a speed $V_2$, the output signal at the output B of the measuring trigger 30 ceases and as a result energisation of the timing device through the gate 18 ceases.

If the timing device times out before the leading edge of the veneer is sensed by the sensor 11, that is if the veneer is travelling at a speed $V_1$, the timing device Z produces a signal which sets the multivibrator 20. The output of the multivibrator 20 together with the output A of the measuring trigger 30 when the sensor 11 senses the leading edge of the veneer, opens the AND-gate 22, the resulting output of the AND-gate 22 then sets the multivibrator 24. The output of the multivibrator 24 is fed to the amplifier 26 and the amplified signal actuates the cutter drive device 28; the output of the multivibrator 24 is also fed to the reset input of the multivibrator 20 whereby to reset the multivibrator 20. During return movement of the cutter after the veneer has been cut, the measuring trigger 34 produces a signal which is fed to the reset input of the multivibrator 24.

In the apparatus particularly described, the veneer strip is cut accurately into pieces of a fixed length with the result that there is relatively low waste in the manufacture of plywood sheets of standardized size. Further comparatively thin, narrow veneers are not displaced in a lateral direction in the apparatus, so that efficient conveying is ensured and wedge-shaped veneer pieces which are of no use are not produced.

What is claimed is:

1. In apparatus for cutting strip materal,
a material infeed conveyor,
cutter means downstream of the infeed conveyor,
a removal conveyor downstream of the cutter means, the removal conveyor being drivable at a higher speed than the infeed conveyor, and
control means operative to selectively actuate the cutter means, the cutter means also being actuable independently of the control means, said control means comprising
first and second sensor means spaced along the path of movement of the removal conveyor and operative to sense material moving along the removal conveyor, and
timer means responsive to the sensor means to determine the speed of movement of the material moving along the removal conveyor such that the cutter means is actuated if the said speed is less than a predetermined speed.

2. Apparatus as claimed in claim 1, further comprising,
an intake device arranged above the infeed conveyor.

3. Apparatus as claimed in claim 2, further comprising,
infinitely adjustable transmission means operative to vary the speed of the infeed conveyor.

* * * * *